United States Patent [19]
Takeuchi

[11] 4,042,198
[45] Aug. 16, 1977

[54] PIPE HANGER

[75] Inventor: Kazuaki Takeuchi, Hita, Japan

[73] Assignee: Chuo Hatsujo Kogyo Co., Ltd., Hita, Japan

[21] Appl. No.: 671,249

[22] Filed: Mar. 29, 1976

[30] Foreign Application Priority Data
Mar. 31, 1975   Japan .................................. 50-044315

[51] Int. Cl.² ............................................. E21F 17/02
[52] U.S. Cl. ................................... 248/62; 248/74 A
[58] Field of Search ..................... 248/58, 62, 63, 64, 248/59, 74 A, 74 B, 301, 304, 305, 339, 340

[56] References Cited
U.S. PATENT DOCUMENTS

| | | | |
|---|---|---|---|
| 981,769 | 1/1911 | Kinowski | 248/62 |
| 1,320,828 | 11/1919 | Bilbrough | 248/62 |
| 2,643,079 | 6/1953 | Pitt | 248/62 |
| 3,022,030 | 2/1962 | Geer | 248/58 |
| 3,317,167 | 5/1967 | Becker et al. | 248/301 |
| 3,323,766 | 6/1967 | Schauster | 248/62 |

Primary Examiner—Robert A. Hafer
Attorney, Agent, or Firm—Frank J. Jordan

[57] ABSTRACT

A pipe hanger includes a pipe holder made from a strip of sheet material and having a lower pipe supporting portion and an upper mounting portion. The lower pipe supporting portion is generally circular and has an opening through which the pipe is inserted. A fitting element mounted on the upper mounting portion and serves to suspend the pipe hanger from a ceiling or the like.

4 Claims, 6 Drawing Figures

PIPE HANGER

BACKGROUND OF THE INVENTION

This invention relates to pipe hangers used to suspend pipes from building structures.

Conventional pipe hangers used to suspend pipes from building structures have been composed of several separate pieces, that is, a mounting, two semi-circular brackets to enclose the pipe, and nuts and bolts to secure the pieces. These conventional hangers considerable required time and labor to assemble and install.

Furthermore, securing a pipe within conventional pipe hangers requires additional time and labor.

With the increase in the size of high rise buildings, the pipes to be installed must be of large volume or size thereby requiring stronger and heavier conventional pipe hangers.

It is an object of the present invention to provide a stronger, light-weight, pipe hanger which is substantially constructed from a light-weight resilient strip. The novel design provides for greater strength in a relatively light weight resilient metal circular portion of the pipe hanger.

In is another object of the present invention to reduce the amount of time and labor required for the installation of the pipe hanger and also to reduce the amount of time and labor necessary to secure the pipe therein.

The pipe hanger of this invention is composed of elements which are permanently attached and require no assembly.

Additionally the pipe hanger of the present invention is composed of resilient material which can easily be temporarily deformed to allow the pipe to be quickly inserted and then will immediately return to the original shape due to the resiliency of the material, thereby firmly securing the pipe. Again the time and labor necessary to install the pipe can be greatly reduced since the bolting operation is eliminated.

The invention is further described with reference to the accompanying drawings.

DESCRIPTION OF THE PREFERRED EMBODIMENTS

The construction of the pipe hanger of this invention is disclosed in conjunction with the accompanying drawings.

Figure 1:
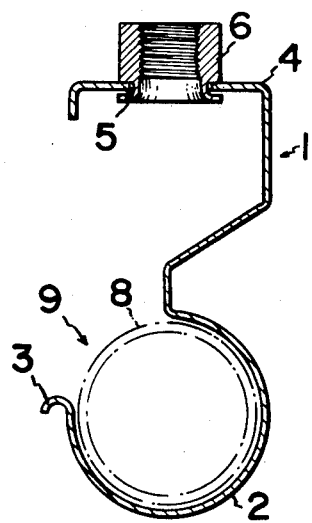
FIG. 1 is a longitudinal cross-sectional side view of a pipe hanger according to one embodiment of the invention.

As shown in FIG. 1, a strip 1 of resilient material such as metal is bent to form a partially-open, circular clamp portion 2 with the free end being bent outwardly and downwardly to form a pipe insertion guide or lip 3, the strip 1 also has a mounting portion 4 formed on the upper part thereof. This mounting portion 4 and the clamp portion 2 are integrally joined to form a pipe holder. The mounting portion 4 has an aperture 5 of the desired diameter at the central portion thereof. Numeral 6 indicates a fitting for suspending the clamp portion 2 from a ceiling by means of a holding bolt 7 (FIG. 5) which is secured to the ceiling. The fitting 6 is rotatably attached to the mounting portion 4 in such a way that the lower portion of the fitting 6 is rotatably inserted through the aperture 5 formed in the mounting portion 4 the outwardly and radially expanded lower portion forming lower flanges portion which is larger than the aperture 5 in diameter.

The inner diameter of the clamp portion 2 ia made to be aproximately the same diameter as the outer diameter of a pipe 8 to be supported.

The width of the opening 9 of the circular clamp portion 2 is a little smaller than the outer diameter of the pipe 8.

Figure 3:
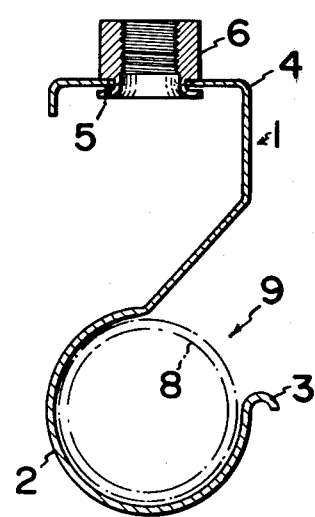
FIG. 3 is a longitudinal cross-sectional side view of a pipe hanger according to another embodiment of the invention.
Figure 2:
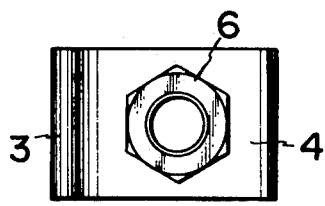
FIG. 2 is a plan view of the pipe hanger shown in FIG. 1.
Figure 4:
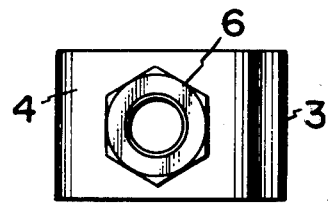
FIG. 4 is a plan view of the pipe hanger shown in FIG. 3.

The opening 9 preferably opens obliquely and upwardly and may be set to open to either right or left as shown in FIG. 1 and FIG. 3; namely, the side on which the opening 9 is located corresponds to the side of the sloping of the clamp portion 2.

Figure 5:
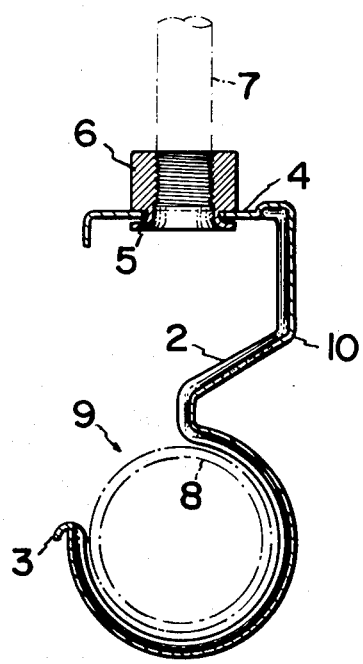
FIG. 5 is a longitudinal cross-sectional side view of a pipe hanger according to a further embodiment of the invention.
Figure 6:
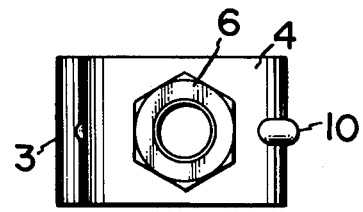
FIG. 6 is a plan view of the pipe hanger shown in FIG. 5.

As shown in FIG. 5, the clamp portion 2 has a rib portion 10 which is formed along the side of the clamp portion for the purpose of increasing the rigidity and strength of the pipe hanger.

The manner in which the pipe 8 is held by the hanger of this invention is hereinafter disclosed.

The fitting 6 of the pipe hanger is first screwed onto the threaded distal end of the holding bolt 7 which is perpendicularly suspended from the ceiling. It is needless to say that the clamp portion 2 of the pipe hanger is also suspended from the ceiling at this stage of operation since the clamp portion 2 is rotatably engaged with the fitting 6. The pipe is then inserted into the clamp portion 2 of the pipe hanger through the opening 9 using the pipe insertion guide 3.

In this case, the opening 9 of the clamp portion 2 to temporarily widened as the pipe 8 passes through the opening 9 into the circular portion, and after the insertion, the opening returns to the original width due to the resiliency of the strip 1 thereby holding the pipe 8 in place while preventing it from slipping out of the hanger.

According to this invention, the insertion or mounting of the pipe into the circular clamp portion 2 of the pipe hanger becomes extremely easy, contributing a remarkable improvement to the operation of installing a pipe which requires considerably less time and labor.

Furthermore since the hanger is substantially made of a resilient material such as stainless steel, the strength and resiliency of the pipe hanger can be maintained almost permanently. While there has been described what is at present considered to be the preferred embodiment of the invention, it will be understood that various modifications may be made therein, and it is intended to cover in the appended claims all such modifications as fall within the true spirit and scope of the invention.

What we claim is:

1. A pipe hanger for suspending a pipe from a ceiling comprising a pipe holder made from an integral strip of sheet material, said pipe holder having a lower pipe supporting portion for receiving and supporting a pipe, said pipe supporting portion being circular over an arc of more than 180° and less than 360° thereby leaving an opening for the insertion of a pipe through said opening into said pipe supporting portion, said pipe holder having an upper mounting portion extending from said lower pipe supporting portion, said mounting portion having a generally horizontal section in which an aperture is formed, a generally vertical section extending downwardly from said horizontal section, and an oblique section extending at an obtuse angle from said vertical section in a direction generally underlying said horizontal section such that the center of said circular pipe supporting portion generally underlies the center of said aperture, and a fitting element having an internal thread adapted to threadedly receive a threaded bolt extending from the ceiling, said fitting element having a generally cylindrical portion, said cylindrical portion having a section of reduced diameter, said aperture in said horizontal section of said mounting portion of said pipe holder being defined by a peripheral edge, said peripheral edge being accommodated and rotatably disposed in said reduced diameter section of said fitting element to thereby rotatably suspend said pipe holder from said fitting element in a position such that the center of said circular pipe supporting portion underlies the axis of said cylindrical portion of said fitting element.

2. A pipe hanger according to claim 1 wherein said opening in said circular arc is generally disposed to underlie said horizontal section.

3. A pipe hanger according to claim 1 wherein said opening in said circular arc is generally disposed to underlie said oblique section.

4. A pipe hanger according to claim 1 further comprising a reinforcing rib formed on said pipe holder.

* * * * *